E. P. BAUGH.
Treating Manure.
No. 47,611. Patented May 9, 1865.
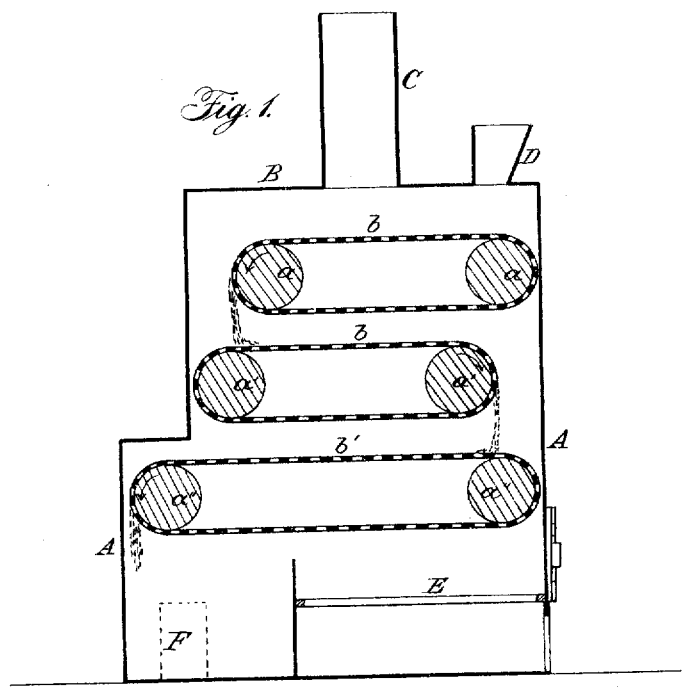
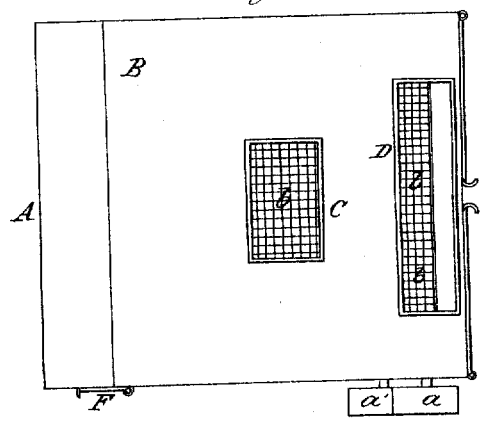
Witnesses:
Inventor:
E. P. Baugh.
by his Attorney
Henry Howson

UNITED STATES PATENT OFFICE.

EDWIN P. BAUGH, OF PHILADELPHIA, PENNSYLVANIA.

IMPROVED METHOD OF TREATING MANURE.

Specification forming part of Letters Patent No. 47,611, dated May 9, 1865.

*To all whom it may concern:*

Be it known that I, E. P. BAUGH, of Philadelphia, Pennsylvania, have invented an Improved Mode of Treating Manures; and I do hereby declare the following to be a full, clear, and exact description of the same.

My invention consists in drying the sewage of cities, poudrette, guano, and other similar substances used as fertilizers by passing through a mass of the material to be dried the products of combustion from any adjacent fire-place.

In order to enable others to practice my invention, I will now proceed to describe the manner in which the same is carried into effect.

The sewage of cities, poudrette, as well as guano, and superphosphate of lime, and other similar substances used as fertilizers, require to be thoroughly dried before they can be packed and transported in any considerable quantities. It has heretofore been the custom to spread the material to be dried in a thin layer on the floors of extensive out-houses or sheds, where it is freely exposed to the air, the material being mixed with such substances as will absorb a portion of the moisture, and being frequently turned and respread in order to fully expose every portion to the air. This process is expensive, both on account of the great space occupied of the buildings and the amount of labor required to constantly turn the material, while a great length of time is required to entirely remove the moisture. Another objection to this process is the necessity of using an absorbent, which increases the mass of the material and proportionately diminishes its strength. In order to obviate these difficulties, I pass the products of combustion from any adjacent fire-place in a continuous current through a mass of the material to be dried, and by this means speedily remove from the same all traces of moisture.

Although many plans may be adopted for carrying out my invention, I prefer the apparatus illustrated in the accompanying drawings, in which—

Figure 1 represents a sectional elevation of the apparatus, and Fig. 2 a plan view.

A A are the walls of a building of any suitable size, and B is the top, on which is a chimney, C, and a hopper, D. Across the interior of the building extend two parallel rollers, $a\ a$, round which passes an endless wire-cloth, $b$, and below these rollers, but a little to one side of the same, are two similar rollers, $a'\ a'$, around which also passes a wire-cloth, $b$, and round rollers $a''\ a''$, situated below the rollers $a'$, passes a similar wire-cloth, $b''$, the rollers $a''\ a''$, however, being a greater distance apart than the rollers above them. At one side of the building, below one of the rollers $a''$, is a fire-place, E, and in the side of the building, near the opposite roller, $a''$, is a door, F. The rollers $a\ a'\ a''$ are caused to rotate slowly by any suitable mechanism, so that the cloths $b\ b$ and $b'$ shall be carried in the direction of their arrows, Fig. 1. A fire is kindled in the fire-place E and the material to be dried is introduced into the hopper D, from which it falls onto the upper cloth, $b$. As the material is carried by the cloth E in the direction of its arrow, it is brought toward the edge of the roller $a$ and thrown over the latter onto the cloth $b$ below, by which it is carried to the edge of the roller $a'$ and deposited onto the cloth $b'$, the latter carrying it to the edge of the roller $a''$, from which it falls onto the floor of the building, near the door F. While the material is being thus slowly carried from the hopper to the base of the building, the products of combustion from the fire-place E are carried upward through the interstices of the cloths $b\ b$ and $b'$, through the material on the latter, and to the chimney C, so that by the time the material is thrown from the cloth $b'$ it is perfectly dry.

Although I have illustrated the fire-place as being situated within the building, it may be outside of the same, and the products of combination may be driven into the building by a fan.

It will be seen that by this process the expensive manipulation and a large portion of the time required by the ordinary process is avoided; that the strength of the material is concentrated instead of diffused, as when an absorbent is mixed with the same, and that by the apparatus described an extended surface of the material may be exposed to the action of the heated products of combustion in a building of limited dimensions. Another advantage arising from the process is the disinfecting by the heated products of combustion of the noxious vapors emitted by the material, which in the old process escaped from the open sheds and caused the establishments to be considered nuisances.

I claim as my invention and desire to secure by Letters Patent—

Drying the sewage of cities, poudrette, guano, and similar substances used as fertilizers by passing through a mass of the material to be dried the products of combustion from any adjacent fire-place.

In testimony whereof I have signed my name to this specification in the presence of two subscribing witnesses.

EDWIN P. BAUGH.

Witnesses:
   CHARLES E. FOSTER,
   JOHN WHITE.